July 31, 1962 W. B. BALDWIN ET AL 3,047,207
WAVE AND TIDE MOTOR
Filed April 28, 1960 3 Sheets-Sheet 3

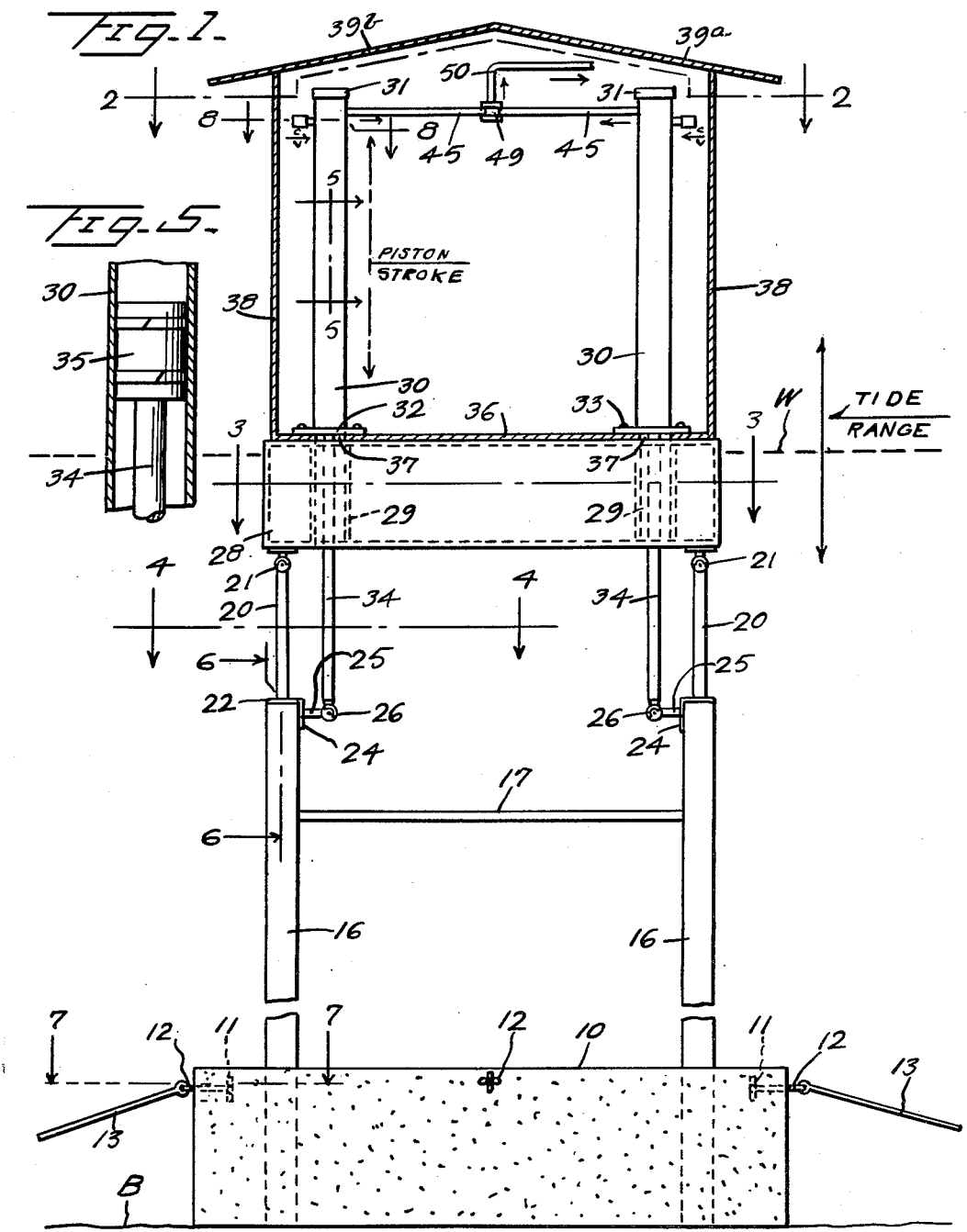

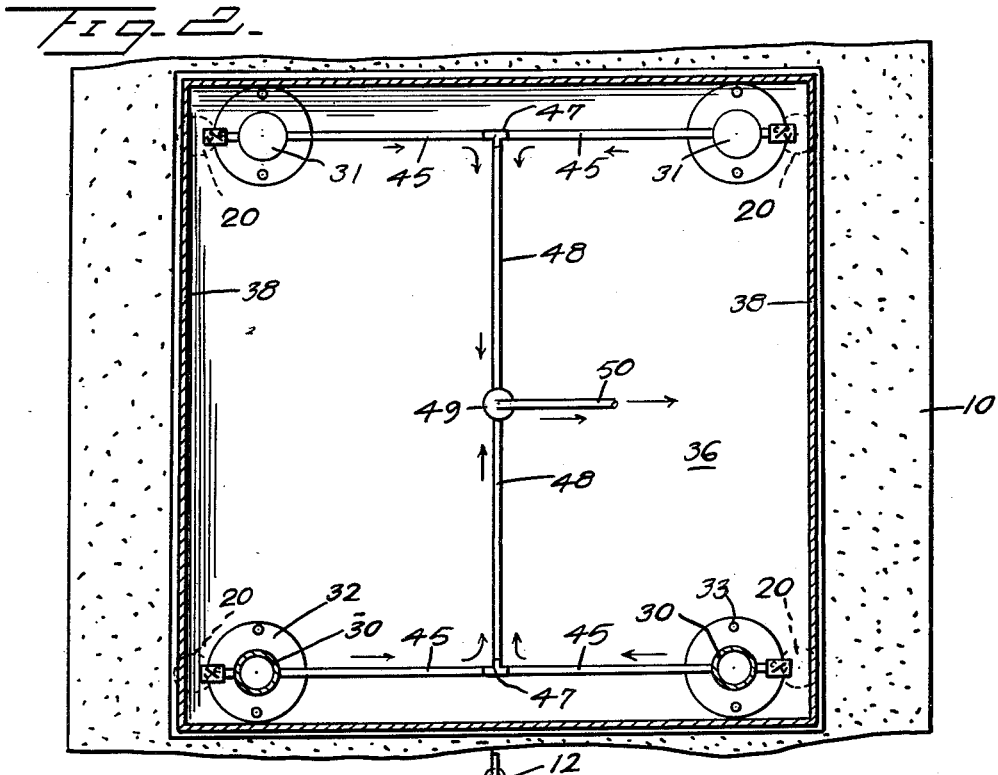
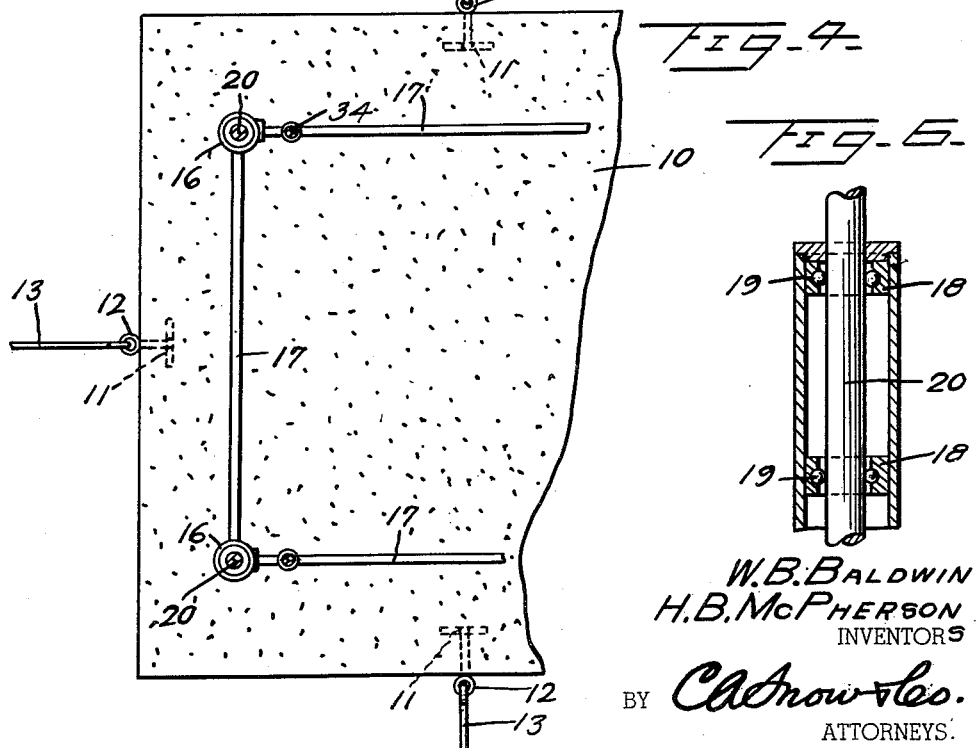
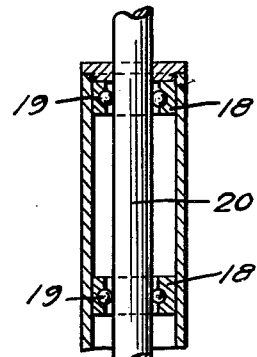

W. B. BALDWIN
H. B. McPHERSON
INVENTORS

BY *CA Snow &Co.*
ATTORNEYS.

United States Patent Office 3,047,207
Patented July 31, 1962

3,047,207
WAVE AND TIDE MOTOR
Winton B. Baldwin, 2519 Kit Carson St., Sacramento, Calif., and Holice B. McPherson, 3641 Highway 50 W., Placerville, Calif.
Filed Apr. 28, 1960, Ser. No. 25,296
1 Claim. (Cl. 230—67)

This invention relates to a motor for converting the energies of the waves and tides into electrical energy.

It is well known that the tides are caused by the shifting of the large bodies of water in the oceans under the gravitational attraction of the sun and the moon, the latter having about three times the effect of the former, due to its closer distance to the earth. Also, that when the large masses of water are lifted by the gravitational attraction above the normal sea level, great quantities of potential energy are stored in those masses of water.

The object of the present invention is to provide a motor for converting the potential energy of the water rising to high tide into electrical energy.

Another object of the present invention is to provide a motor for converting the undulating forces of the waves in a body of water into electrical energy.

A further object of the present invention is to provide a motor for simultaneously converting the potential energy of the water rising to high tide and the undulating forces of the waves into electrical energy.

An additional object of the present invention is to provide a motor for developing electrical energy without fuel cost by the utilization of the energies of the tides and waves in a body of water.

Still other objects, advantages and improvements will become apparent from the following specification, taken in connection with the accompanying drawings in which:

FIGURE 1 is a side elevational view, partly in section, showing the wave and tide motor according to the present invention.

FIG. 2 is a sectional view, taken on the section line 2—2 of FIG. 1 and looking in the direction of the arrows, and showing the compressor cylinders and the compressed air outlet lines leading from same.

FIG. 3 is a sectional view taken on the section line 3—3 of FIG. 1 and looking in the direction of the arrows, showing the barge or bottom of the housing for the wave and tide motor according to the present invention.

FIG. 4 is a sectional view, taken on the section line 4—4 of FIG. 1 and looking in the direction of the arrows, and showing the flexible support for the barge or bottom of the housing.

FIG. 5 is a detail sectional view, taken on the section line 5—5, of FIG. 1 and looking in the direction of the arrows, and showing the interior of one of the compressor cylinders and the piston therein.

Figure 6:
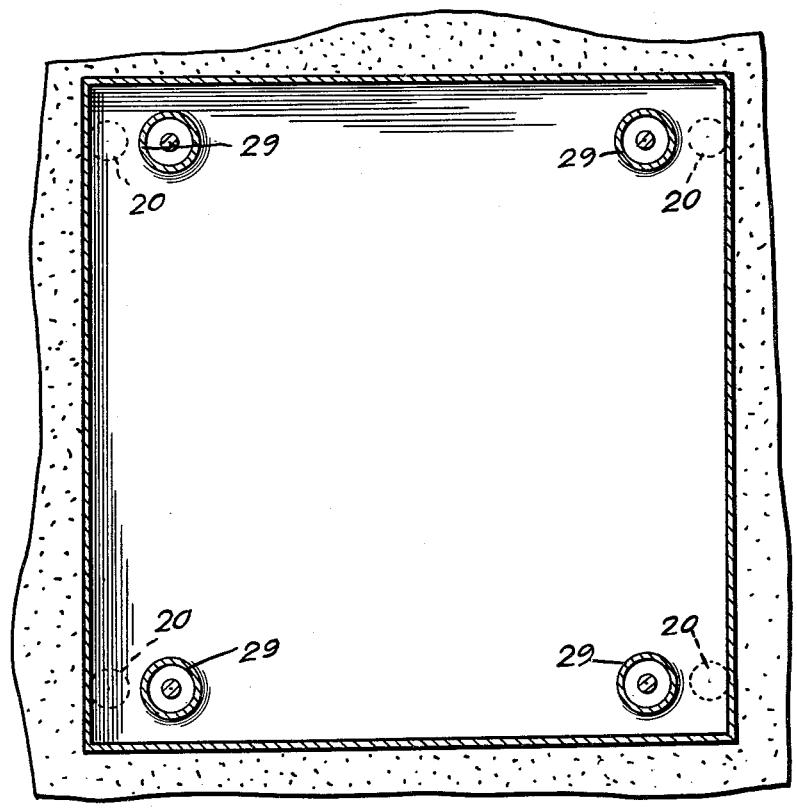
FIG. 6 is a detail sectional view, taken on the section line 6—6 of FIG. 1 and looking in the direction of the arrows, and showing one of the guide cylinders and the supporting rod therein for the barge or bottom of housing.
Figure 7:
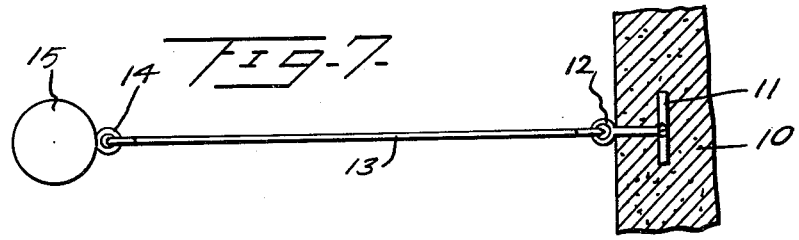
FIG. 7 is a partial top plan and partial sectional view, taken on the section line 7—7 of FIG. 1 and looking in the direction of the arrows, and showing the attachment of one of the guy cables to the anchor block.
Figure 8:
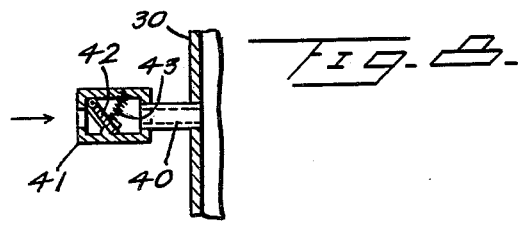
FIG. 8 is a detail sectional view taken on the section line 8—8 of FIG. 1 and looking in the direction of the arrows, and showing the inlet valve of one of the compressor cylinders.

Referring now to the drawings in detail, and to FIG. 1 in particular, the motor according to the present invention is shown mounted on an anchor block 10, which rests on the bottom B of a body of water W in which tides occur. The anchor block 10 is shown as being made of concrete, but it could as well be of cast iron or steel. In the various sides of the anchor block 10 and adjacent the top there are positioned eye bolts 12, which are screwed into nuts or plates 11 embedded in the body of the block. Guy cables 13 are secured at one end in the eye bolts 12 and at their other ends into screw eyes 14, which latter are secured in piles 15 driven into the bottom of the body of water W.

At the corners of a rectangle or square four (4) vertically extending guide cylinders 16 are embedded at their lower ends into the anchor block 10. At a level slightly above the mid-heights of the guide cylinders, the cylinders on each side of the rectangle or square are joined by brace rods 17, which latter are secured to the cylinders in any suitable manner, as by welding. Within the guide cylinders 16 there are positioned at spaced intervals, at least two races 18 carrying the usual ball bearings 19. Supporting rods 20 are positioned axially of the guide cylinders 16 and constrained for sliding movement by the ball bearings 19 in the races 18.

The bottom of the housing for the motor, herein termed a barge, since it floats on the water, is comprised by a waterproof right angle parallelepiped structure 28, which is closed at its sides, top and bottom. Spaced inwardly along the sides of the square or rectangular outline of the guide cylinders 16, the barge is provided with sleeves 29, which latter extend through suitable aligned holes in the top and bottom walls of the barge and are united along their circumferences, as by welding to the top and bottom walls. The supporting rods 20 are secured to the bottom wall of the barge by articulated connections comprised by universal joints 21.

The compressor cylinders 30 are positioned to overlie and have their bores registering with the openings through the sleeves 29. At their upper ends the compressor cylinders are closed by screw caps 31, while at their bottoms they are formed with flanges 32. Bolts 33 pass through suitable holes in the flanges 32 and secure the compressor cylinders to the floor 36 of the motor housing to be later described.

At their tops the guide cylinders are closed by plates 22, which have central apertures for receiving the supporting rods 20 and which are flanged on their circumferences to form central bosses 23. The central bosses are received within the inner walls of the guide cylinders 16. The closure plates 22 also have integral right angle lugs 24, which extend downwardly along the side walls of the guide cylinders 16 and are secured thereto, as by welding, arms 25. Pistons 35 are reciprocally mounted within the compressor cylinders 30 and have piston rods 34 secured thereto. At their lower ends the piston rods 34 are secured to the arms 25 on the closure plates 22 by articulated connections comprised by universal joints 26.

A housing is comprised by a floor 36, side walls 38, and a two (2) part sloping roof 39a and 39b. The floor 36 is secured in any suitable manner to the top plate of the barge 28 and has suitable holes 37 therein which register with the bores through the sleeves 29 and the compressor cylinders 30.

Adjacent their tops the compressor cylinders are provided with intake valves designated generally as c/v as shown in FIG. 2. These valves are comprised by nipples 40, screwed into suitable holes in the walls of the compressor cylinders, valve housings 41 screwed onto the nipples, and pivoted valve members 42, which are biased to the closed position by compression springs 43, within the housings 42.

Also adjacent their tops, the compressor cylinders 30 are provided with outlet lines 45, which likewise are screwed into suitable holes in the walls of the cylinders. The branch lines 45—45 from the pairs of cylinders along opposite side walls of the housing meet in T's 47, from which lines 48 extend along the longitudinal center line of the housing. Check valves may be inserted in the branch lines 45—45 to limit the flow of the compressed air to the direction away from the compressor cylinders 30, if desired. At the intersection of the longitudinal and transverse center lines of the housing, the lines 48—48 are united in a T 49, from which a main line 50 extends to the place where the compressed air is to be used.

It is contemplated that the line 50 will lead to rotary compressed air engine mounted on the floor 36 of the housing and drivably connected to an electric generator. Also, the line 50 may lead to a storage tank, which would likewise be mounted on the floor 36 of the housing. A check valve would be inserted in the line 50 ahead of the storage tank and would be used for any purpose for which compressed air is normally used. It would also be feasible to use the compressed air to operate the rotary engine and to provide the storage tank ahead of the engine, as a stabilizing medium. In such case, check valves could be inserted in the line 50 ahead of the tank and in the line between the tank and the engine, to limit the flow of the compressed air to the direction from the tank to the engine.

In operation, the anchor block 10 is positioned on the bottom B of a body of water where tides and, of course, waves occur. The barge 28 floats on the surface of the body of water W and rises and falls with the flood and ebb tides, respectively, within the range delineated by the double-ended arrow and designated "Tide Range" (FIG. 1). As it rises with a high tide, the pistons 35 compress the air in the compressor cylinder 30, and force same outwardly through the lines 45, T's 47, lines 48, T 49 and the main compressed air line 50, to either a compressed air engine or a storage tank, as the case may be; as the barge 28 falls with a low tide, the pistons 35 draw air from the ambient atmosphere through the inlet check vanes c/v on the compressor cylinders 30.

As the waves on the surface of the body of water W dash against one side of the barge 28 it will be lifted up on that side and the compressor cylinders 30 on the other side will be correspondingly moved downwardly around the piston 35 therein, to compress the air in the compressor cylinders. If the waves approach the barge at an angle, and thus impinge on two sides of the latter at once, the barge will be lifted up about an axis through two diagonally positioned compressor cylinders 30—30, the axis being approximately at right angles to the line of approach of the waves and the compressor cylinder on the opposite side of said axis from the direction of approach of the waves will be moved downwardly around the piston 35 therein to compress the air in the compressor cylinder.

Since the barge 28 and the housing 38 therein are pivotally mounted for tilting movement in any direction perpendicular to the surface of the water W, by the universal joints 21 between the supporting rods 20 and the bottom of the barge and by the universal joints 26 between the guide cylinders 16 and the piston rods 34, the barge is responsive to and the compressor cylinders 30 are moved by the forces exerted by the waves without regard to what angle the latter approach the barge.

Having now fully described our invention, what we claim as new and useful and desire to secure by Letters Patent of the United States is:

A wave and tide motor compressor unit comprising a substantially square anchor block adapted to be positioned on the bottom of a body of water, vertically positioned guide cylinders mounted in said anchor block adjacent the corners thereof, supporting rods mounted for reciprocating movement within each of said guide cylinders and having one end thereof extending vertically therefrom, a barge including parallel top and bottom walls mounted on the extending ends of said supporting rods and adapted to float on the surface of a body of water, pivotal connections between said supporting rods and the bottom wall of the barge, sleeves extending in perpendicular relation between the top and bottom walls of said barge in inwardly spaced adjacent relation to the ends of said supporting rods, vertically positioned compressor cylinders mounted on said barge in vertical alignment with said sleeves, pistons reciprocal in said compressor cylinders, piston rods connected at their upper ends to said pistons, said piston rods extending through the sleeves in said barge and having their free ends terminating adjacent the free ends of said guide cylinders, an arm secured at right angles to each of said guide cylinders and each pivotally connected at its free end to the free end of each of said piston rods, a check valve mounted at the upper end of said compressor cylinders, a discharge line secured to each of said compressor cylinders at the upper end thereof through which air compressed in said compressor cylinders passes, and a protective housing for said compressor cylinders mounted on said barge, said housing including opposed side and end walls and a pitched roof structure.

References Cited in the file of this patent
UNITED STATES PATENTS

| | | |
|---|---|---|
| 599,756 | Wright | Mar. 1, 1898 |
| 675,039 | Graff | May 28, 1901 |
| 748,757 | Langstroth | Jan. 5, 1904 |
| 870,706 | Woodward | Nov. 12, 1907 |
| 884,080 | Fallis | Apr. 7, 1908 |
| 888,721 | Milbury | May 26, 1908 |
| 950,460 | Skirtun | Feb. 22, 1910 |
| 2,783,022 | Salzer | Feb. 26, 1957 |